(12) United States Patent
Hedberg

(10) Patent No.: US 6,411,275 B1
(45) Date of Patent: Jun. 25, 2002

(54) HAND-HELD DISPLAY DEVICE AND A METHOD OF DISPLAYING SCREEN IMAGES

(75) Inventor: Anders Hedberg, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/220,264

(22) Filed: Dec. 23, 1998

(30) Foreign Application Priority Data

Dec. 23, 1997 (SE) .............................................. 9704856

(51) Int. Cl.[7] .............................................. G06F 3/00
(52) U.S. Cl. ..................... 345/156; 345/204; 345/684; 345/786; 345/828; 345/829; 345/830; 345/831; 345/864; 348/36; 348/39
(58) Field of Search ........................... 345/8, 121, 123, 345/146, 156, 157, 352; 348/36, 39, 61, 115

(56) References Cited

U.S. PATENT DOCUMENTS

| | | | |
|---|---|---|---|
| 4,734,689 A | * | 3/1988 | Kurakake .................. 345/123 |
| 5,526,481 A | * | 6/1996 | Parks et al. ................. 395/341 |
| 5,655,094 A | | 8/1997 | Cline et al. |
| 5,686,690 A | * | 11/1997 | Lougheed et al. ......... 89/41.17 |
| 5,825,353 A | * | 10/1998 | Will ........................... 345/184 |
| 5,905,525 A | * | 5/1999 | Ishibashi et al. .............. 348/39 |

FOREIGN PATENT DOCUMENTS

JP          7234664         8/1972

* cited by examiner

*Primary Examiner*—Bipin Shalwala
*Assistant Examiner*—Vincent E. Kovalick
(74) *Attorney, Agent, or Firm*—Burns, Doane, Swecker & Mathis, L.L.P.

(57) ABSTRACT

In a hand-held display device for use with an electronic device to display a complete or a determined part of a screen image, there are included control circuits, a display screen and control buttons connected to said control circuits. Further, a gyroscope is incorporated in said display device and connected to said control circuits, whereby said display device is responsive to movements in the space for displaying said screen image in different magnification, and/or in different parts. A fixed pointer is arranged on the display screen for controlling applications show on eh display screen.

10 Claims, 3 Drawing Sheets

HAND-HELD DISPLAY DEVICE AND A METHOD OF DISPLAYING SCREEN IMAGES

The present invention relates to a hand-held display device, including a pointer, and a method for its use with an electronic device to display a complete or a determined part of a screen image.

Several electronic devices, such as a mobile telephone, a PDA (Personal Digital Assistent), an organizer, or a PC (personal computer) etc. are provided with a display or a monitor for displaying different kind of information. A typical personal computer system, notebook, or hand-held computer consists of a system unit, storage means, a display, keyboard and a mouse or other interactive input devices such as a digitizing tablet, joystick, lightpen etc. to control the computer.

The primary attributes of a display is the size of the display screen; the resolution of the display; and whether the display is monochrome or in colour. The size of a display screen can vary from, for example, 5 to 25 inches in diagonal dimension. The quality of output or the resolution of a common display or monitor is for example 640×480, 800×600, or 1024×768 pixels.

There is a variety of displays available from different vendors. These displays are designed to accomplish particular functions. An engineer needs a large high-resolution monitor for CAD-applications and a smaller monochrome monitor for the display of text and graphic information. A full-page colour monitor can be utilized for both landscape and portrait presentations. Also, hand-held data entry devices or computers are provided with a small display. A common hand-held data entry device has a limited keyboard and some kind of storage capability for the data. Another hand-held data entry device combines a hand-held optical wand with a keyboard. Stock clerks use such devices in stores to collect and enter reorder data.

For some purposes small flat-panels are required to save space. Flat-panels are used in conjunction with small size electronic devices such as notebooks, hand-held computers, mobile telephones etc.

Many vendors offer or are just about to offer hand-held computers. These computers are provided with flat-panels having for example a 640×240 resolution touchscreen, or 480×240 resolution touchscreen. Such panels or display screens cannot be too limited in size and resolution to be useful for their intended purpose, i.e. to present general software applications such as word processing, desktop publishing, spreadsheet, databases, internet applications etc. The limitations are set in view of the sight properties of a human being.

Consequently, a problem associated with prior art computer configurations is that access is needed to several types of computers provided with different displays suitable for different kinds of applications. As described above, a very small sized flat-panel of a hand-held data entry device, a mobile telephone, or a computer etc. is not at the same time capable of displaying full-screen documents in a proper and readable way.

JP-A-7 234 664 discloses a document image display, which reads out the contents of a document using a scanner and the image of the document is stored in a page memory. An area of the document specified by an operator is read from the memory and then magnified. The magnified area, stored in a working memory, is then displayed on an operation display.

Another problem or disadvantage associated with small devices such as hand-held computers or mobile telephones etc. is the cumbersome way in which applications and data are selected on the display of the device. Of course, it is not suitable to use a mouse in combination with a handheld device. Consequently, hand-held devices are provided with cursor control devices such as a trackball or a touch pad, in combination with push buttons, or arrow keys. However, said cursor control devices have a lower size limit, i.e. they must be large enough to be handled by a human hand.

SUMMARY

An invention disclosed by a previous Swedish patent application No. 9703589-3 is directed to an improved display device for use with an electronic device, which overcomes one or more of the limitations and disadvantages of the related art.

It is an object of said invention to provide a hand-held display device for use with an electronic device, said display device being suitable for the purpose of a hand-held data entry device as well as for both landscape and portrait presentations of a full-page word processing document. Further, it can satisfy the needs of an engineer working with CAD-applications as well as for the display of text and graphic information. Also, hand-held computers can be provided with a display device of the present invention.

Consequently, another object of said invention is to provide a hand-held display device for use with a computer to display a complete or a determined part of a screen image in a proper size with regard to the current needs or requirements of a user.

Still another object of said invention is to provide a display device incorporated in an electronic device such as a mobile telephone, a PDA (Personal Digital Assistent), an organizer, a data terminal to display a complete or a determined part of a screen image in a proper size with regard to the current needs or requirements of a user.

These objects are accomplished by a display device having movement sensitive means such as a micro gyroscope, strain gauge, piezo-electric, or equilibrium of force accelerometer etc incorporated in said display device, thereby being responsive to movements in the space for displaying the complete screen image in different magnifications, or in different parts.

Further, a method of displaying a complete or a determined part of a screen image in a proper size with regard to the current needs or requirements of a user is also provide by said invention, wherein said display device is activated by pressing an activation control button of said display device, and said display device is moved essentially in the plane of said display device, whereby different parts of a complete screen image are shown on said display screen, and/or said display device is moved essentially in a direction perpendicular to the plane of said display device, whereby the magnification of said screen image is changing.

However, an object of the present invention is to provide said display device with an appropriate cursor control device, small enough to fit in on said display device and large enough to be handled by a human hand in an efficient way. This is accomplished by a fixed pointer arranged on the display screen of the display device according to the invention disclosed by the Swedish patent application No. 9703589-3.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION

Figure 1:
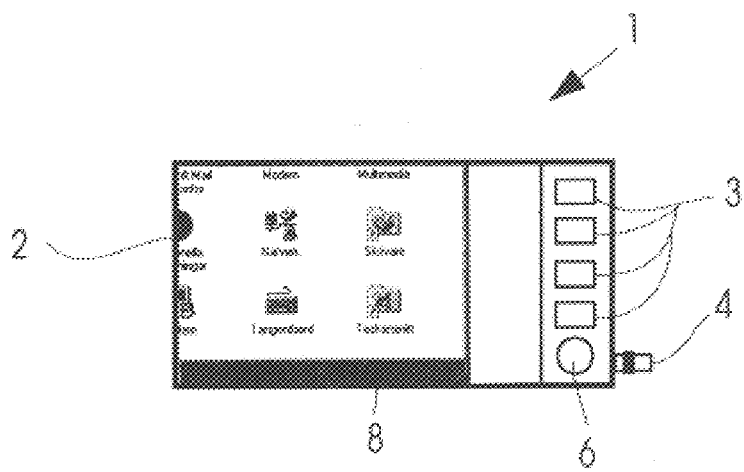
FIG. 1 is a front view of a display device according to one embodiment of the present invention, showing a cutting of a complete screen image.

A display device 1 according to the present invention for use with an electronic device such as a mobile telephone, a PDA (Personal Digital Assistant), an organizer, a data terminal or a computer to display a complete or a determined part of a screen image is shown in FIG. 1. Said display device is provided with control circuits, not shown in FIG. 1. A display screen 2 and control buttons 3, such as touch control buttons, are incorporated in said display device 1 and connected to said control circuits. For connection with a computer or a network connection means 4, for example an IR (infra red) or radio transmitter/receiver, or a connection cabel etc. is attached to the display device.

Movement sensitive means 6 comprising a micro gyroscope, strain gauge, piezo-electric, or equilibrium of force accelerometer etc is incorporated in said display device 1 and connected to said control circuits, said display device being responsive to movements in the space for displaying the complete screen image in different magnifications, and/or different parts of a screen image.

Power supply for the display device is provided by for example local batteries, sunlight power, kinetic energy, or the power supply of an attached computer.

One of said control buttons 3 is an activation control button provided for activation of said display device 1 to be responsive for movements. Thus, said display device 1 is activated by pressing said activation control button 3, and then by moving said display device 1 essentially in the plane of said display device, different parts of a screen image are shown on the display screen 2.

Figure 2:
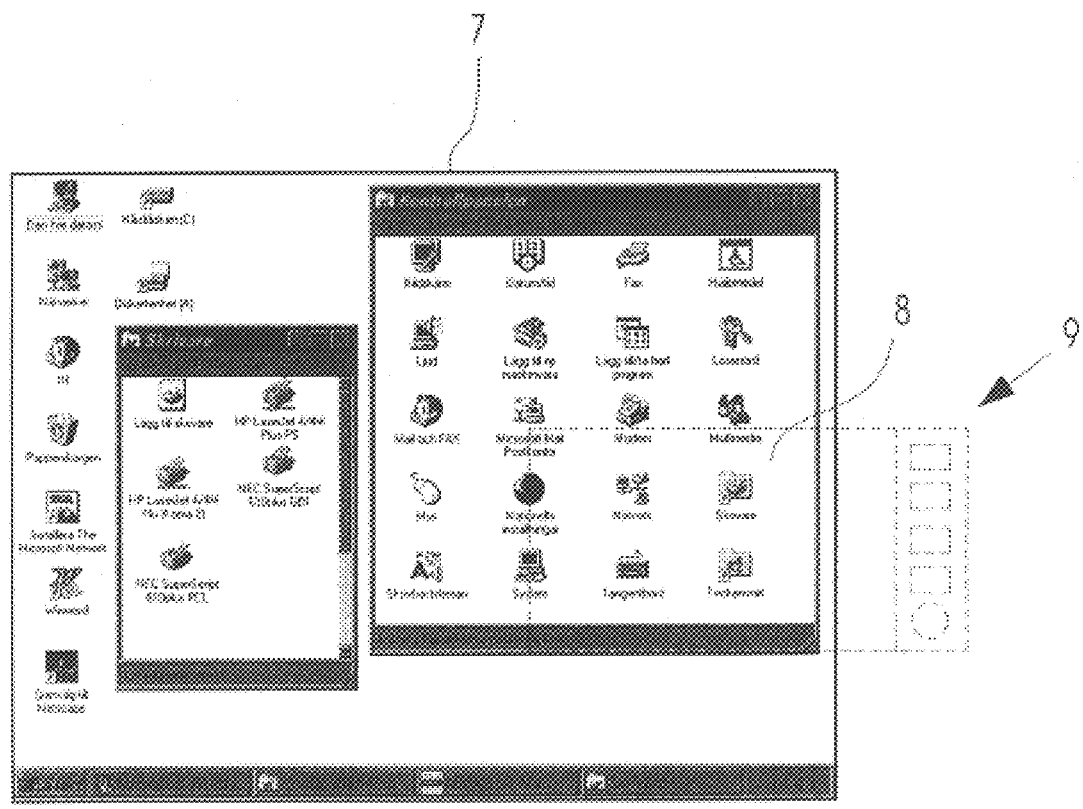
FIG. 2 is a schematical view of the complete screen image including the cutting in FIG. 1, on a conventional CRT-device with a superimposed virtual display device according to the present invention.

This is schematically illustrated in FIG. 2, wherein a cutting 8, corresponding to the image shown on the display screen 2 in FIG. 1, is surrounded by a superimposed dashed virtual display device 9 corresponding to the size of the display device 1. When said virtual display device 9 is moved around on said screen image 7, different cuttings 8 are covered. Correspondingly, these cuttings 8 are displayed when the real display device 1 is moved in the plane of said display device.

Figure 3:
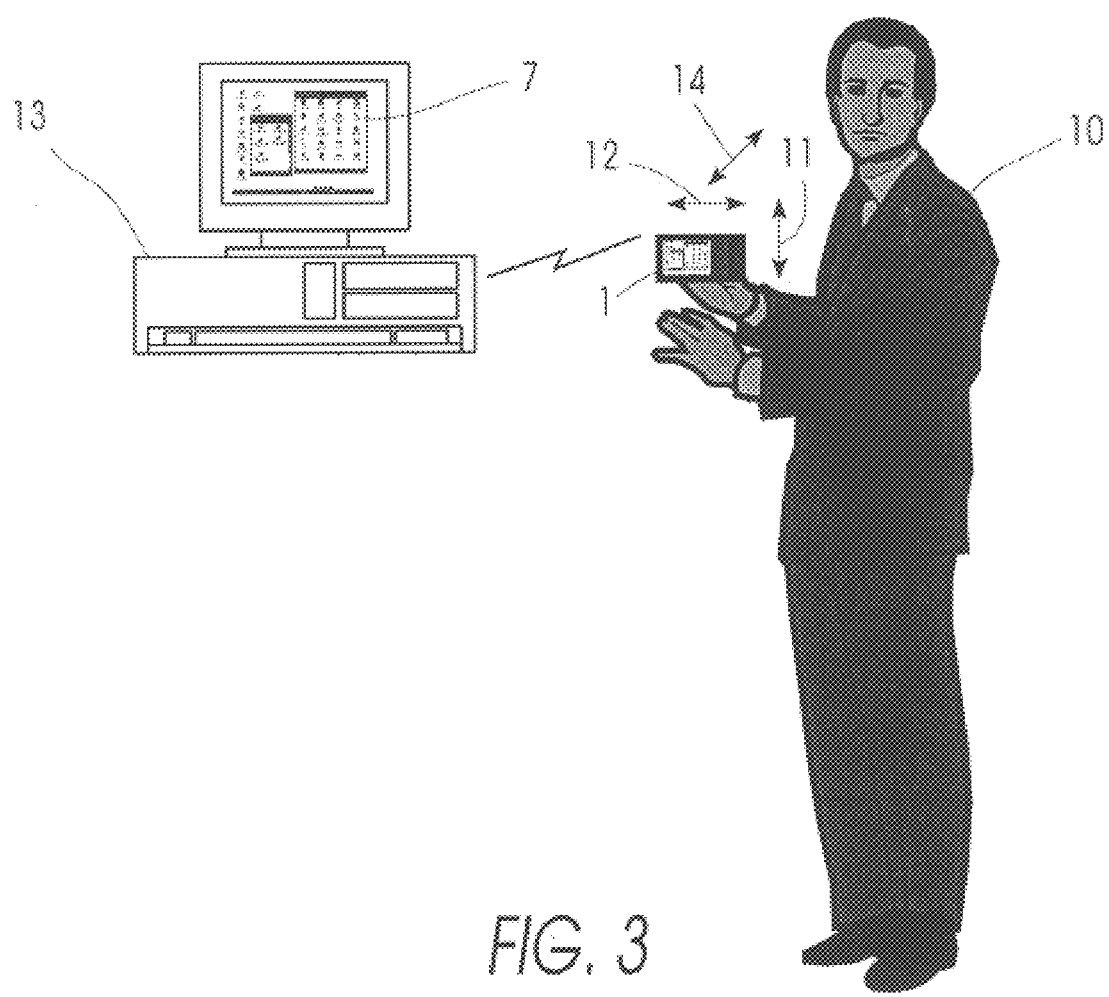
FIG. 3 is a view of a computer configuration provided with the display device according to the invention, operated by a user.

As shown in FIG. 3, a user 10 is moving said display device up and down, illustrated by an arrow 11, and to the left and right, illustrated by an arrow 12, to present different parts of the screen image 7. In a particular position in the space the cutting 8 of the screen image 7 is presented on the display screen 2. Hence, it is possible for the user of the display device 1 to read text that does not actually fit into the small display screen 2, by moving the display device a short distance in space in the plane of said display device.

Figure 4:
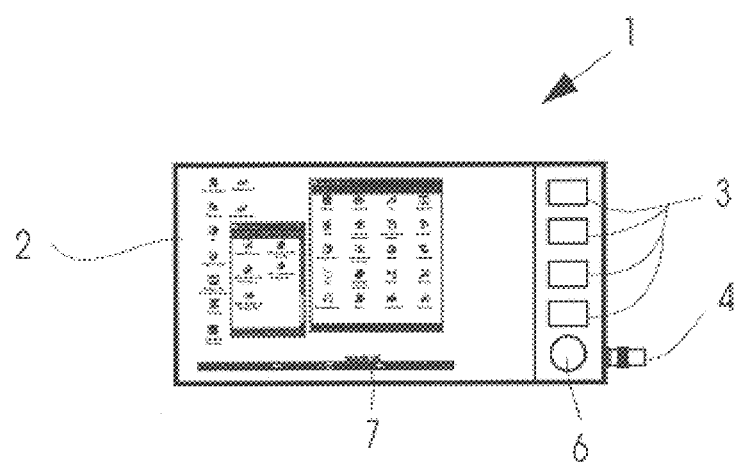
FIG 4 is a front view of the display device of FIG. 1, showing the complete screen image of FIG. 2 in a compressed shape.

By activation of said display device 1 by pressing said activation control button 3 and then moving said display device back and forth, essentially in a direction perpendicular to the plane of said display device, illustrated by an arrow 14, the magnification of said screen image 7 is changed or the image is zoomed. As shown in FIG. 3 and in more detail in FIG. 4, it is possible to zoom out as much as an overview of the complete screen image 7 is shown on the display device 1.

Figure 6:
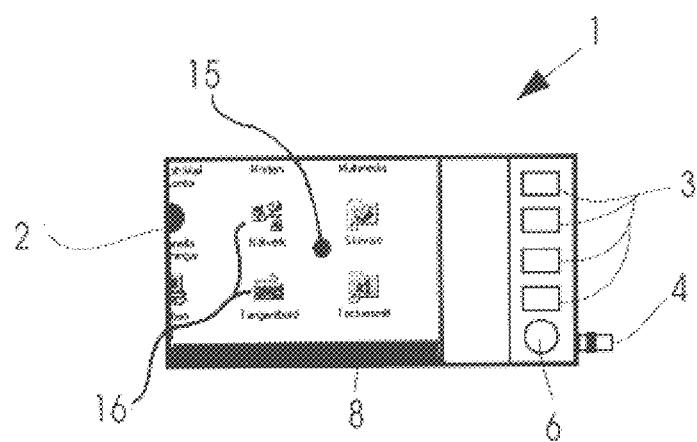
FIG. 6 is a front view of the display device in FIG. 1 provided with a fixed pointer according to the invention.

In an embodiment of the invention, shown in FIG. 6, said display device is provided with an appropriate cursor control device, small enough to fit in on said display device and large enough to be handled by a human hand in an efficient way. A fixed pointer 15 is arranged on the display screen 2 of the display device 1 according to the invention. Thus, said display device 1 is activated by pressing one of said activation control buttons 3 and by then moving said display, device back and forth, as illustrated by an arrow 14 in FIG. 3, the magnification of said screen image 7 being changed or the image being zoomed. As shown in FIG. 3 and in more detail in FIG. 4, it is possible to zoom out as much that an overview of the complete screen image 7 is shown on the display device 1. With reference to FIG. 6, when a particular field of the screen image is shown on the display screen and, for example, a desired application represented by an icon 16 is located "under" the fixed pointer, the user activates or starts the application by pressing one of the controlbuttons dedicated for this "cursor" control function. Further, the fixed pointer is used to select data, activate windows, or scroll windows and perform other similar functions usually done by means of a conventional mouse or track ball.

It should be apparent that the present invention provides an improved display device 1, including a pointer, and a method for use with an electronic device such as a computer 13 to display a complete or a determined part of a screen image 7 by moving said display device 1 in the space, wherein different parts of the screen image 7 are shown in different magnifications on said display screen 2, and for controlling applications 16 shown on the display screen 2 in a convenient and efficient way. Although the invention has been described in conjunction with a specific embodiment thereof, this invention is susceptible of embodiments in different forms, with the understanding that the present disclosure is to be considered as an exemplification of the principles of the invention and is not intended to limit the invention to the specific embodiment illustrated.

For example, in another embodiment of the invention the different parts: display screen, movement sensitive means, control buttons, electronic circuits and/or connection means, of said display device can be incorporated as a single unit or as separate parts in an electronic device such as a mobile telephone, a PDA (Personal Digital Assistant), an organizer, data terminal, or a hand-held computer, wherein the operations described above are performed in a similar manner. Consequently, the conventional keypad of the particular electronic device may comprise control buttons for the display functions of the invention. Further, these kinds of electronic devices, provided with a display device of the invention, can work as stand alone devices with no need for connection means, as well as devices having a connection with another electronic device or network.

Figure 5:
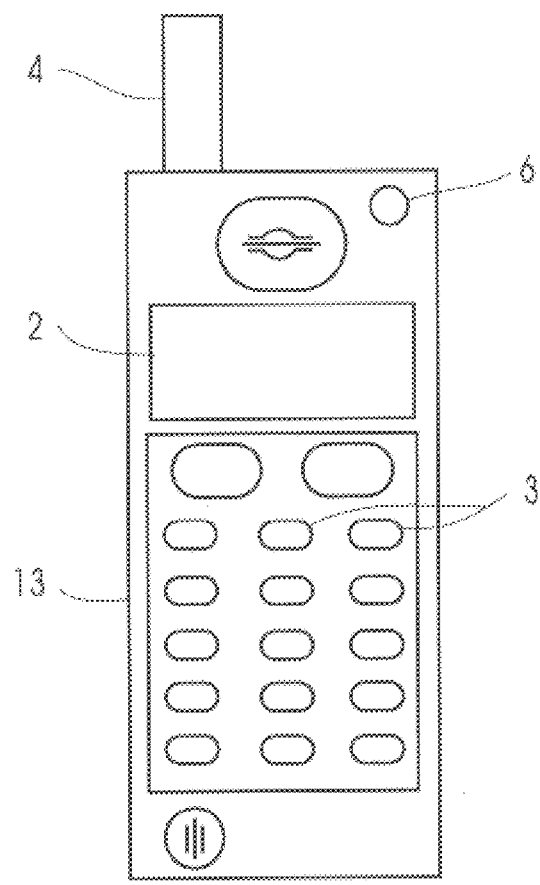
FIG. 5 is a front view of a mobile telephone provided with a display device according to the invention.

In a particular embodiment of the invention said display device is incorporated in a mobile telephone unit providing both computer and telephone facilities, shown in FIG. 5. The conventional transmitter/receiver units of the mobile telephone may be utilized as connection means for connection with other electronic devices or networks.

Different kinds of technologies can be utilized for the display screen 2, such as LCD (liquid crystal display), gas plasma, EL (electroluminescent), TFT (thin film transistor) etc.

What is claimed is:

1. A hand-held display device for use with an electronic device to display a complete or a determined part of a screen image, the device comprising control circuits, display screen control buttons connected to said control circuits, movement sensitive means in and connected to said control circuits, whereby said display device is responsive to movements in the space for displaying said screen image in different magnifications, and/or in different parts, and a fixed pointer physically arranged on a portion of the display screen, wherein an activation of at least one of the display screen control buttons initiates a task associated with a portion of the magnified and/or part of the screen image aligned with the fixed pointer.

2. A display device according to claim 1, wherein the task associated with the portion of the screen image aligned with the fixed pointer controls applications, selects data, activates windows, or scrolls information in said windows.

3. A display device according to claim 1, further comprising movement sensitive means comprising a micro gyroscope, strain gauge, piezo-electric, or equilibrium of force accelerometer.

4. A display device according to claim 1, further comprising connection means for connection with an electronic device or a network.

5. A display device according to claim 4, wherein said connection means is a light or radio transmitter/receiver, or a connection cable.

6. A display device according to claim 1, wherein it is incorporated in a mobile telephone, a PDA (Personal Digital Assitent), an organizer, data terminal, or a hand-held computer.

7. A display device according to claim 1, further comprising an activation control button provided for activation of said display device to be responsive for movements.

8. A display device according to claim 1, wherein said display screen is an LCD-display, a gas plasma display, an EL (electroluminescent) display, or a TFT (thin film transistor) display.

9. A method of displaying a complete or a determined part of a screen image provided by an electronic device connected to a hand-held display device, the hand-held display device including control circuits, display screen control buttons connected to said control circuits, movement sensitive means incorporated in said display device and connected to said control circuits, whereby said display device is responsive to movements in the space for displaying said screen image in different magnifications, and/or in different parts, and a fixed pointer physically arranged on a portion of the display screen, the method comprising the steps of:

activating said display device;

moving said display device substantially in the plane of said display device, whereby different parts of a complete screen image are shown on said display screen; and/or moving said display device substantially in a direction perpendicular to the plane of said display device, whereby the magnification of said screen image changes;

wherein an activation of at least one of the display screen control buttons initiates a task associated with a portion of the magnified and/or part of the screen image aligned with the fixed pointer.

10. The method according to claim 9, wherein the task associated with the portion of the screen image aligned with the fixed pointer controls applications, selects data, activates windows, or scrolls information in said windows.

* * * * *